United States Patent Office 2,944,919
Patented July 12, 1960

2,944,919
METHOD OF APPLYING A PROTECTIVE COATING TO A FERROUS METAL SURFACE

Lester Morris and Flora Lombardo, Los Angeles, Calif., assignors to Amercoat Corporation, County of Los Angeles, Calif., a corporation of California No Drawing. Filed May 17, 1957, Ser. No. 659,752

12 Claims. (Cl. 117—127)

This invention relates to protective coatings for metal surfaces and particularly to such coatings of the metal dust-binder class and the metal articles protected thereby.

Protective coatings are commonly applied to ferrous metal articles to prevent corrosion or oxidation of the surfaces. To be effective, such coatings should be continuous and impervious to corrosive or oxidizing elements, should be sufficiently hard to withstand the normal abrasion and shock to which metal objects are frequently subjected, and should have a high degree of adherence to the surface of the metal article.

A typical protective coating includes a pigment grade zinc dust in a binder of sodium silicate. Conventionally, a protective coating of this type may be formed by preparing an aqueous mixture of finely divided zinc and sodium silicate and applying the mixture to a clean metal surface. Upon evaporation of the water, a relatively insoluble coat of sodium silicate entrapping the finely divided zinc is formed. The drying operation, or curing, may be carried out by heating the coated article or merely setting it aside and allowing it to dry. A secondary reaction takes place on weathering and to a small extent during the curing operation. The finely divided zinc reacts with the sodium silicate to form an insoluble silicate if water is present. In addition, sodium silicate hydrolyzes in the presence of water forming sodium hydroxide. This reaction gives rise to a residual alkalinity which adversely affects a subsequently applied paint or secondary coat.

The efficiency of such a coating depends on the insolubility of the sodium silicate ($Na_2O:SiO_2$) used and the completeness of the cure. The solubility of sodium silicate varies with the ratio of $Na_2O$ to $SiO_2$ the solubility decreasing with increasing amounts of $SiO_2$ Sodium silicate having a high ratio of $Na_2O$ (i.e., $Na_2O:SiO_2$ ratio between 1:1 and 1:2.6) normally cannot be used in mechanically cured coatings since the resulting binder is sufficiently soluble to be readily dissolved or pitted by small amounts of water. A further disadvantage of this grade sodium silicate is that the high alkalinity caused by the $Na_2O$ cuts the pot life or period of time during which the aqueous zinc dust-sodium silicate mixture may be applied. On the other hand, sodium silicate sufficiently insoluble to be suitable for use in such coatings (i.e., $Na_2O:SiO_2$ ratios between 1:2.8 and 1:3.6) are difficult to prepare conveniently.

Efforts have been made to improve the efficiency of silicate type coatings by using a chemical cure to convert the sodium silicate to an insoluble silicate salt. In order to eliminate residual alkalinity and permit the use of more soluble sodium silicates, an acid reaction has been attempted. Such efforts have been only partially successful. The rate of cure throughout the coating is not uniform, curing first on the surface and then progressively through the coating. As the surface cures, further penetration of the coating by the curing agent is inhibited, preventing thorough curing. Adhesion between the ferrous surface and the coating is not completely satisfactory until thorough curing takes place and thus the coat has a tendency to break or shrink. Further, in such cures, if the acid strength is too great, the rate of reaction is so rapid that essentially no internal curing takes place or the rate of cure is too slow. Further, the zinc dust may be converted to a salt, seriously reducing its efficiency as a galvanizing agent.

Finally, since the zinc particle size in such conventional coatings is normally less than 6 microns, a mixture of zinc dust and sodium silicate is unstable, the fine zinc reacting readily with the silicate. This instability requires the constituents of coating to be packaged in separate containers, thereby increasing the cost of manufacture and packaging.

Accordingly, one of the principal objects of the present invention is to provide a protective coating for ferrous metal surfaces which may be uniformly and controllably cured by chemical means.

A further object of the present invention is to provide such a protective coating which is essentially stable having a minimum residual alkalinity.

A further object of this invention is to provide a protective coating which adheres readily and firmly to ferrous metal surfaces.

Another object of this invention is to provide a composition suitable for use in protective coatings which is stable when dry and in aqueous solutions.

Still another object of this invention is to provide a composition suitable for use in protective coatings which may be cured with acidic, neutral or basic materials.

A further object of this invention is to provide a method of applying a protective coating to ferrous metal articles.

A more particular object of this invention is to provide a ferrous metal article having a stable, firmly adhering protective coating.

Other objects and advantages of the present invention, it is believed, will be readily apparent from the following detailed description of a preferred embodiment thereof.

Generally, the coatings which are the subject of this invention depend on the formation of a ceramic binder which carries and encloses a powdered galvanizing metal. Such a coating is achieved by combining a primary coat comprising a powdered galvanizing metal and a binder with a secondary coat comprising a soluble polyvalent metal salt, the metallic ion of which is capable of reacting with the primary coat to form an insoluble metal salt of a ceramic nature.

The primary coat may include powdered metals such as zinc, magnesium, aluminum, manganese and titanium. Zinc or a mixture of zinc and aluminum or manganese is preferred since the galvanizing action of the powdered zinc is superior to most other metals. The metal used should be pure and as free of its oxide as is practical. The particle size of the metal has an important relation to the amount of binder necessary to completely entrap and hold it and to the efficiency of the curing operation. Smaller particle sizes require larger amounts of binder and reduce the porosity of the applied primary coat. In accordance with the present invention, we have determined that to be satisfactory, the particle size of the metal used should be in the range of from 8 to 100 microns and preferably have an average particle size greater than 10 microns. By the use of metals having the specified particle sizes, the applied primary coat has a porosity sufficient to permit complete penetration thereof by the secondary coat.

The primary coat binder conventionally consists of a sodium silicate. We have determined that other materials may be substituted for or combined with sodium silicate to provide a substantially ceramic binder for the entrapped metal. Such materials include red lead ($Pb_3O_4$), or the peroxides of calcium, magnesium and zinc. Since the ultimate protective coating does not depend upon the dehydration of sodium silicate, more soluble sodium silicates can be used, permitting easier, more rapid preparation of the primary coat mixtures. The ratio of $Na_2O$ to $SiO_2$ should be in the range of from 1:1 to 1:2.6 with a preferred ratio of 1:2.0. Sodium silicates having higher ratios of $SiO_2$ are more insoluble and thus more difficult to prepare while such ratios lower than 1:1 are too alkaline to be effective. In addition, the use of the more soluble sodium silicates combined with the larger particle size galvanizing metal provides unexpectedly longer pot life so that the primary coat may be used for extended periods of time without setting up or increasing in viscosity. Further, the mixture of the metal and dry sodium silicate is sufficiently stable to permit them to be premixed and packaged in a single unit.

As will be indicated below, the protective coatings depend on two separate chemical reactions, one based on silicate and the other based on an oxidizing agent such as red lead or metal peroxides. These reactions may take place either independently or together. The oxidizing agents may, therefore, be substituted for the silicate or combined with it. When such oxidizing agents are used, they should be of at least commercial grade and substantially free of water. The use of red lead has additional advantages. We have determined that a primary coat including red lead extends the pot life of the mixture in addition to increasing the hardness of the cured coat. In addition, since in the reaction it is reduced to lead oxide (PbO) there is a positive color change. The completeness of the cure can therefore be followed by observing the change in color of the coat.

To the primary coat may be added weak acids such as boric, phosphoric and carbonic or their acid salts. Such materials are useful in preventing residual alkalinity in coatings having high ratios of sodium oxide. This is particularly true when the primary coat is overloaded with the sodium silicate as is necessary when the average metal particle size in the primary coat is less than 10 microns.

The ratio of powdered metal to binder is determined by the amount of binder necessary to wet the metal and is a function of the particle size of the metal and density of metal and binder used. We have determined that the by weight ratio of zinc having particle sizes in the range of from 8 to 100 microns to sodium silicate, the ratio of $Na_2O:SiO_2$ being in the range of from 1:1 to 1:2.6 may vary from 10 parts zinc to 1 part sodium silicate to 30 parts zinc to 1 part sodium silicate. When the average zinc particle size is between 10 and 20 microns, more sodium silicate is required to wet the particles and ratios closer to 10:1 are required. As the particle size increases the amount of sodium silicate may be decreased.

Expressed more generally, we have determined that the volume ratio of powdered metal to sodium silicate within the particle size and $Na_2O:SiO_2$ ranges specified should lie in the range of from 3.6 to 10. Expressing this relation as an equation, we have determined that the ratios should be such that $$3.6 \leq \frac{V_m}{V_b} \leq 10$$

The relative proportion of sodium silicate in the binder may vary from 0% sodium silicate to 100% sodium silicate, depending on the type of coating and type of reaction desired. The by weight amount of acidic material specified above may vary from 0% to 50% of the weight of the binder.

The secondary or curing coat consists essentially of an aqueous solution of a soluble salt of a polyvalent metal, the metal being selected from that class having oxidation-reduction potentials in acid solutions equals to or greater than zinc. In "The Oxidation States of the Elements and their Potentials in Aqueous Solutions" by Wendell M. Latimer, published by Prentiss-Hall, Inc. (1938), at page 294, the E° value of the zinc couple is given as 0.7620. As indicated by that reference, polyvalent metals within the class described are:

Zinc (E° 0.7620)        Magnesium (E° 2.34)
Manganese (E° 1.05)     Lanthanum (E° 2.37)
Aluminum (E° 1.67)      Calcium (E° 2.87)
Beryllium (E° 1.70)     Strontium (E° 2.89)
Titanium (E° 1.75)      Barium (E° 2.90)

The water soluble salts of these polyvalent metals are satisfactory for use in the present coating compositions. It will be noted that the soluble salts of some of the metals indicated above are acidic in nature. It has been generally supposed that highly acidic salts such as zinc chloride or aluminum chloride alone would be unsatisfactory for chemically curing a silicate-type coating since the acid salt would readily attack the zinc in addition to reacting rapidly with the silicate preventing complete curing. We have determined, however, that by making the secondary coat neutral or basic by the addition of ammonia in the form of commercial ammonium hydroxide or boric acid or a mixture thereof, a thorough and complete cure may still be obtained. In some cases the use of such pH adjusting compounds is not necessary. By increasing the speed of penetration or controlling the ionization of the metal salt, a satisfactory cure may be obtained. We have determined that the speed of penetration may be increased by the addition of a nonionic wetting agent or a small amount of an alcohol having a lower boiling point than water, or a mixture of these constituents. The use of alcohols or other organic water-miscible solvents having lower boiling points than water to control ionization of the metal salt is well known in the art. When an alcohol or wetting agent is used to increase the speed of penetration, ionization of the metal salt is not appreciably affected but penetration is sufficiently rapid to prevent premature surface curing. When a water miscible organic solvent is used to control ionization, no appreciable reaction occurs until a substantial quantity of the organic solvent has evaporated.

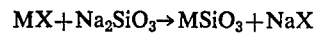

The amount of the polyvalent salt affects only the speed of the cure, more concentrated solutions permitting more rapid curing but tending to cause surface cure which adversely affects completeness of cure. It has been determined that a 10% to 20% by weight solution of the soluble salt is sufficient, this percentage permitting the coat to be completely penetrated and readily cured and being, at the same time, economically practicable. The ratio of the organic solvent when used as an ionization inhibitor to water may be varied over a wide range, and depends on the ionization characteristics of the particular salt used. Generally, the volume ratio of solvent to water should be between 35 and 80 parts solvent to 65 to 15 parts water. The by weight amount of nonionic wetting agent to the aqueous polyvalent salt solution will depend on the particular wetting agent used and may vary between 1% and 6%. The by weight amount of alcohol, when used to increase speed of penetration, should be between 3% and 8% of the polyvalent salt solution. The use of more alcohol tends to inhibit the ionization of the metal salt and slow the rate of cure.

As indicated above, essentially two types of reactions may take place between the primary and secondary coats to provide the protective coating. The first reaction involving silicate may be characterized as follows:

$$MX + Na_2SiO_3 \rightarrow MSiO_3 + NaX$$

where:

M = Polyvalent metal, and
X = cation lending solubility to metal salt.

The second principal reaction occurs between the oxidizing agent, zinc and secondary coat and may be characterized as follows:

$$G + PO_2 + MX + H_2O \rightarrow G(OH)X - M(OH)X + PO$$

where:

G = powdered galvanizing metal
M = polyvalent metal
X = cation lending solubility to metal salt
$PO_2$ = selected metal peroxide, and
PO = resulting metal oxide, In the latter case, a further reaction may occur between the oxide and sodium silicate in the presence of water. This reaction may be characterized as follows:

$$PO + H_2O + Na_2SiO_3 \rightarrow PSiO_3 + NaOH$$

These reactions are independent and may take place in the same reaction scheme. The metal silicates $MSiO_3$ and $PSiO_3$ and the complex reaction product $$G(OH)X - M(OH)X$$

are highly insoluble and firmly hold and entrap the powdered galvanizing metal while adhering firmly to the ferrous metal surface. It will be apparent that both these insoluble products may be formed at the same time, permitting the formation of coats having different chemical characteristics.

The general method by which the insoluble coating is applied to ferrous articles is as follows: the surface of the article to be coated should be as clean as possible since grease and dirt tend to prevent adequate bonding between the coating and the surface of the metal. Cleaning may be accomplished by acid etching, sandblasting or any of the methods well known in the arts. A thin layer of the prepared primary coat is then applied and allowed to dry. Because of the relatively large particle size of zinc used, a highly porous initial surface results. To the dried coating is then liberally applied the secondary or curing coat. This solution penetrates the dried primary coat, reacting with it in accordance with the scheme outlined above.

The secondary coating is allowed to stay in contact with the primary coat until curing is completed as indicated, for example, by the fading of the red lead color. The article is then thoroughly washed with water and allowed to dry. The resulting coat is a hard, impervious layer which adheres firmly to the metal surface and has a minimum residual alkalinity, the relatively coarse zinc particles being trapped in the insoluble binder and providing an adequate galvanized coat to prevent oxidation of the ferrous metal surface.

The following specific examples illustrate the compositions of the primary and secondary coats and the methods by which insoluble protective coatings may be applied to various metal articles. In these examples the powdered metals are substantially pure, having a minimum amount of the metal oxide. The acids and the other reagents are of commercial grade unless otherwise specified.

*Example I*

A 2 foot by 4 foot sheet of mild steel was sandblasted to white metal. To a mixture of 3.5 pounds of zinc dust having an average particle size of 10 microns and .23 pound of sodium silicate ($Na_2O:SiO_2$ ratio of 1:2, 17% water) was added 0.6 pound of 97% red lead, 0.025 pound of powdered boric acid and 7 pounds of tap water. This mixture was stirred for five minutes and the resulting composition was applied to the cleaned steel sheet by a brush, using full, light strokes so as to leave a coating of approximately 3 mils. The coated sheet was left to dry for one hour at room temperature. After drying, the surface film was scraped lightly with a knife and was found to be tough and a metallic luster was apparent. A solution containing a mixture of 2 pounds of aluminum chloride, 4 pounds of water and 10 pounds of isopropyl alcohol was liberally sprayed on the dried surface, the liquid being permitted to freely flow over the entire surface and to remain on the coated surface for one hour. The sheet was then thoroughly washed with water. It was observed that the initial pink color caused by the presence of red lead had turned to a deep blue-gray. The resulting surface was extremely hard and insoluble in boiling water.

*Example II*

A sheet of mild steel was prepared as in Example I. To a mixture of 3.0 pounds zinc dust having an average particle size of 15 microns and a minimum particle size of 10 microns and 0.23 pound of sodium silicate ($Na_2O:SiO_2$ ratio, 1:2, 17% water) was added 7 pounds of tap water. This mixture was stirred for ten minutes and the resulting composition was applied to the cleaned steel by spray so as to leave a coating of approximately 3 mils. The coated sheet was left to dry at room temperature for one hour. After drying, the surface film was scraped lightly with a knife, was found to be tough and a metallic luster was apparent. A solution containing a mixture of 2 pounds of magnesium chloride ($MgCl_2 \cdot 6H_2O$) and 5 pounds of water was liberally sprayed on the dried surface, the liquid being permitted to freely flow over the entire surface and to remain on the coated surface for one hour. The sheet was then thoroughly washed with water and allowed to dry. A light gray film, somewhat softer than that produced by the aluminum cure was formed which was insoluble in boiling water.

*Example III*

The steps taken in Example II were repeated using calcium chloride. The resulting surface was similar to that achieved with the magnesium chloride.

*Example IV*

To a cleaned 16 gauge steel panel was applied the primary coat as described in Example I so as to form a coating approximately 1 mil thick. The resulting primary coat was allowed to dry. The dried coat was liberally sprayed with an aqueous solution of manganese chloride (20 parts manganese chloride to 100 parts water) and the cured coat allowed to remain in contact with the primary coat for one hour. The panel was then thoroughly washed with water and allowed to dry. The resulting coating showed little or no residual alkalinity and no change in the coating was noted after immersion for twenty-four hours in boiling water. The panel was bent around a steel bar having a one inch radius. No cracking was observed until the panel had been bent 90° out of its plane.

*Example V*

A 2 foot by 4 foot sheet of mild steel was sandblasted to white metal. A mixture of 1.2 pounds of red lead and 3 pounds of zinc dust having average particle size of 14 microns was applied to the cleaned surface. A curing coat consisting of a solution of 3 pounds of barium chloride and 5 pounds of water was liberally sprayed over this coating. The curing coat was allowed to remain in place and the steel sheet air dried for twenty-four hours. After drying, the sheet was immersed in water at 140° F. for forty-eight hours. At the end of that time the film was hard and apparently firmly adhering to the sheet.

*Example VI*

A sheet of mild steel was cleaned as in Example I. To a mixture of 2.0 pounds of aluminum powder having an average particle size of 35 microns and a maximum particle size of 75 microns and .23 pound sodium silicate ($Na_2:SiO_2$ ratio, 1:2, 17% water) was added 0.3 pound of red lead and 1 pound of water. This mixture was applied to the clean steel sheet to form a layer 2 mils thick. The resulting primary coat was allowed to dry; the dried coat was liberally sprayed with an aqueous solution of magnesium chloride (20 parts magnesium chloride to 100 parts water) and the curing coat allowed to remain in contact with the primary coat for one hour. The panel was then thoroughly washed with water and allowed to dry. The resulting coating adhered firmly to the sheet and was insoluble in boiling water.

The following are examples of additional primary coats which may be prepared and applied as indicated in Examples I through VI.

*Example VII*

| | Pounds |
|---|---|
| Sodium silicate ($Na_2O:SiO_2$ ratio, 1:1) | 0.125 |
| Zinc (average particle size 15 microns) | 4.0 |
| Boric acid | 0.07 |
| Red lead | 0.6 |
| Water | 1.0 |

*Example VIII*

| | Pounds |
|---|---|
| Zinc (average particle size 14 microns, minimum particle size 10 microns) | 4.0 |
| Zinc peroxide | 0.4 |
| Sodium silicate ($Na_2O:SiO_2$ ratio, 1:2.2) | 0.23 |
| Water | 1.0 |

*Example IX*

| | Pounds |
|---|---|
| Zinc (average particle size 18 microns, maximum particle size 35 microns) | 4.0 |
| Calcium peroxide | 0.6 |
| Sodium silicate ($Na_2O:SiO_2$ ratio, 1:2) | 0.23 |
| Water | 1.2 |

*Example X*

| | Pounds |
|---|---|
| Zinc (average particle size 20 microns, minimum particle size 12 microns) | 1.86 |
| Red lead (97%) | 0.34 |

*Example XI*

| | Pounds |
|---|---|
| Zinc (average particle size 12 microns, minimum particle size 8 microns) | 4.0 |
| Red lead (97%) | 0.6 |
| Sodium silicate ($Na_2O:SiO_2$ ratio, 1:2.0) | 0.23 |
| Water | 1.0 |

The above primary coats form satisfactory protective coatings when applied to ferrous metal articles. In Example VI magnesium or manganese may be substituted for aluminum powder without affecting the efficiency of the protective coat. It is understood that in curing the primary coat, a polyvalent metal salt having an oxidation-reduction potential as indicated above equal to or greater than the powdered metal used should be employed in the secondary coat. For example, if aluminum is used in the primary coat, salts of magnesium, calcium or barium may be used in the secondary coat.

The following are examples of additional curing coats which may be used to cure specific primary coats.

*Example XII*

| | Pounds |
|---|---|
| Water | 0.7 |
| Anhydrous zinc chloride | 2.5 |
| Boric acid | 0.2 |

A solution of these compounds has a pH of 2 and may be used to satisfactorily cure a primary coat containing powdered zinc.

*Example XIII*

| | Pounds |
|---|---|
| Water | 4.0 |
| Magnesium sulfate $4(MgSO \cdot 7H_2O)$ | 5.0 |
| Bentonite clay | 0.4 |
| Glycerine | 1.0 |

A solution of these compounds has a pH of 6.5. Such a secondary coat does not bring about the oxidation-reduction reaction and therefore should be used only with silicate-containing primary coats.

*Example XIV*

| | Pounds |
|---|---|
| Magnesium chloride ($MgCl_2 \cdot 6H_2O$) | 5.0 |
| Dilute ammonium hydroxide (10% solution) | 3.0 |

The pH of the resulting solution is approximately 8.5.

*Example XV*

| | Pounds |
|---|---|
| Magnesium chloride anhydrous | 3.0 |
| Boric acid | 0.2 | pH adjusted to 8 by the addition of dilute ammonium hydroxide.

*Example XVI*

| | Pounds |
|---|---|
| Magnesium chloride ($MgCl_2 \cdot 6H_2O$) | 6.0 |
| Water | 3.0 |
| Nonionic wetting agent (Triton X-100) | .6 |
| Isopropyl alcohol | .6 |

In addition to the examples given, salts of polyvalent metals, such as strontium nitrate, calcium nitrate, titanium tetrachloride, manganese sulfate, beryllium chloride and aluminum nitrate may be used to form the insoluble polyvalent metal silicate and insoluble zinc complexes. Since the ratio of metal to binder is dependent on the amount of binder necessary to wet the metal, various nonionic wetting agents may be used advantageously to lower the amount of binder required to wet the metal. In addition, other compounds may be advantageously used in both the primary and secondary coats to achieve special purposes. For example, metal chromates may be added to either primary or secondary coats to enhance anticorrosive purposes. Other additions and modifications will be apparent, it is believed, to those skilled in the art.

Having fully described our invention, it is to be understood that we do not wish to be limited to the precise details of the examples set forth but our invention is of the full scope of the appended claims.

We claim:

1. The method of producing a hard impervious coating upon a ferrous metal surface which comprises applying to said surface first (a) a primary coating comprising a mixture of a finely divided metal selected from the group consisting of zinc, magnesium, aluminum, manganese and titanium, and from about 10% to 40% by weight based upon said metal of an oxidizing agent selected from the group consisting of red lead and the peroxides of calcium, magnesium, and zinc, allowing said primary coating to dry, and thereafter applying on said primary coating (b) a curing agent for said mixture comprising an aqueous solution of a water soluble salt of a polyvalent metal, said polyvalent metal having an oxidation-reduction potential in acid solution equal to or greater than that of said finely divided metal.

2. The method of claim 1 in which (a) contains sodium silicate having a ratio of $Na_2O$ to $SiO_2$ ranging from about 1:1 to 1:2.6, the ratio by weight of metal to sodium silicate ranging from about 10:1 to 30:1.

3. The method of claim 1 in which the oxidizing agent is red lead.

4. The method of claim 1 in which the oxidizing agent is zinc peroxide.

5. The method of claim 1 in which the oxidizing agent is calcium peroxide.

6. The method of claim 1 in which the finely divided metal is zinc.

7. The method of claim 1 in which the curing agent includes a small amount of a water-miscible organic solvent.

8. The method of claim 1 in which the curing agent is an aqueous solution of aluminum chloride and an alcohol, said alcohol having a lower boiling point than water, the amount by volume of the alcohol being from about 3% to 6% of said solution.

9. The method of claim 1 in which the curing agent comprises a 10% to 20% aqueous solution of the polyvalent metal salt.

10. The method of producing a hard impervious coating upon a ferrous metal surface which comprises applying to said surface first (a) a primary coating comprising the mixture of finely divided zinc and red lead, the proportion by weight of red lead to zinc ranging from about 10% to 40%, allowing said primary coating to dry, and thereafter applying on said primary coating (b) a curing agent for said mixture comprising an aqueous solution of a water soluble salt of a polyvalent metal, said polyvalent metal having an oxidation-reduction potential in acid solution equal to or greater than that of zinc, said aqueous solution containing from about 3% to 6% of a water soluble alcohol.

11. The method of claim 10 in which the alcohol is isopropyl alcohol.

12. The method of claim 10 in which (a) contains sodium silicate having a ratio of $Na_2O$ to $SiO_2$ ranging from about 1:1 to 1:2.6, the ratio by weight of zinc to sodium silicate ranging from about 10:1 to 30:1.

References Cited in the file of this patent

UNITED STATES PATENTS

| | | |
|---|---|---|
| 2,327,002 | Thompson | Aug. 17, 1943 |
| 2,462,763 | Nightingall | Feb. 22, 1949 |
| 2,509,894 | Toulmin et al. | May 30, 1950 |
| 2,576,845 | McDonald | Nov. 27, 1951 |
| 2,673,817 | Burns | Mar. 30, 1954 |